United States Patent
Potter et al.

(10) Patent No.: US 6,341,552 B1
(45) Date of Patent: Jan. 29, 2002

(54) SELF-CALIBRATING SYSTEM AND METHOD FOR CONTROLLING A HYDRAULICALLY OPERATED DEVICE

(75) Inventors: James C. Potter, Novi; Larry P. Bennett, Franklin, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/560,663

(22) Filed: Apr. 27, 2000

(51) Int. Cl.⁷ .............................................. F15B 13/044
(52) U.S. Cl. ............................. 91/433; 91/459; 91/470
(58) Field of Search .......................... 91/433, 459, 469, 91/470

(56) References Cited

U.S. PATENT DOCUMENTS

| | | | |
|---|---|---|---|
| 4,712,470 A | * 12/1987 | Schmitz | 91/433 |
| 4,781,080 A | 11/1988 | Iwatsuki | |
| 4,947,893 A | 8/1990 | Miller et al. | |
| 4,970,941 A | * 11/1990 | Reinhardt | 91/433 |
| 5,012,722 A | * 5/1991 | McCormick | 91/433 X |
| 5,337,871 A | * 8/1994 | Testerman | 192/85 R |
| 5,492,009 A | * 2/1996 | Kempf et al. | 73/168 |
| 5,513,673 A | 5/1996 | Slavin et al. | |
| 5,513,832 A | 5/1996 | Becker et al. | |
| 5,718,316 A | 2/1998 | Gee | |
| 5,728,986 A | 3/1998 | Bennett et al. | |
| 5,853,028 A | 12/1998 | Ness et al. | |
| 5,853,076 A | * 12/1998 | McKee et al. | 192/87.14 |
| 6,022,293 A | 2/2000 | Dourra et al. | |
| 6,078,856 A | * 6/2000 | Malson | 701/57 |

FOREIGN PATENT DOCUMENTS

| | | |
|---|---|---|
| EP | 0 628 742 A1 | 12/1994 |
| EP | 0 841 238 A2 | 5/1998 |
| EP | DE 198 06 544 A1 | 8/1998 |

* cited by examiner

Primary Examiner—John E. Ryznic
(74) Attorney, Agent, or Firm—Daniel S. Kalka; Roger A. Johnston

(57) ABSTRACT

A self-calibrating method and system 10 for controlling a hydraulically operated device, such as a clutch actuator 24 in an automatic power transmission, provides a pressure switch 30 in the hydraulic circuit that provides feed-back to the controller 32 when the hydraulic fluid pressure has reached a set point level. Pressure switch 30 provides a signal to controller 32 that allows the controller to compare the control signal at the pressure set point level with that of the calibrated curve for adjusting the calibration curve.

15 Claims, 3 Drawing Sheets

SELF-CALIBRATING SYSTEM AND METHOD FOR CONTROLLING A HYDRAULICALLY OPERATED DEVICE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates generally to a self-calibrating system and method for controlling a hydraulically operated device, and more particularly to a self-calibrating system and method for controlling an actuator employed in an automatic power transmission.

2. Description of the Related Art

Hydraulically operated devices or actuators are employed in a wide variety of applications including, but not limited to, vehicle applications. For example, hydraulic actuators are used in automatic power transmission systems and variable assist power steering systems. Recently manufactured vehicles use an electronic control module (ECM) which often operates with additional electronic control modules like a transmission control module (TCM) for effecting shift control of the transmission. The TCM may be integrated into the ECM, or as a separate unit located on the vehicle outside the transmission. Some manufacturers intend to position the TCM inside the transmission.

An ECM and TCM contain microprocessors with programmable control logic and may be implemented in a variety of combinations of hardware and/or software circuitry components known in the art to control the various vehicle systems or subsystems, operating in conjunction with hydraulically operated devices. When a TCM receives a command signal to adjust the hydraulic fluid pressure for an actuator, the TCM sends a current signal to an electrically operated hydraulic valve. The hydraulic valve in response thereto adjusts the pressure for hydraulically controlling a device like a clutch piston.

Currently, TCMs are manufactured independently of the hydraulic components they are designed to control. The TCMs are designed with tight tolerances on the current output and the hydraulic components are calibrated to achieve a desired hydraulic pressure output band (tolerance) for a given current input. Even with the tight tolerances, the hydraulic output pressure varies considerably from transmission device to transmission device. When the current signal tolerance is added to the hydraulic pressure tolerance of the device, a significant difference between the commanded pressure and the actual pressure output can result. The same desired pressure electrical command given to two different TCMs can yield different hydraulic pressure outputs.

Consequently, there is a need for a system and method for controlling a hydraulic device that automatically self-calibrates. The self-calibrating system and method preferably provides constant feed-back to adjust to the hydraulic circuit to reduce and even eliminate tolerance and wear effects. In this way, the system and method will verify that the actual pressure is fairly close to the desired pressure.

BRIEF SUMMARY OF THE INVENTION

Accordingly, an object of the present invention is to provide a method for automatically calibrating a hydraulic control system.

Another object of the present invention is to provide a self-calibrating system for controlling a hydraulically operated device.

A further object of the present invention is to provide a self-calibrating system for controlling a hydraulically operated device for use in an automatic power transmission.

The above and other objects of the present invention are accomplished with a method that automatically calibrates a hydraulic control system. The method of the present invention comprises the steps of providing a source of hydraulic fluid pressure and supplying the fluid pressure to the inlet of an electrically operated pressure control valve, connecting the outlet of the pressure control valve to a hydraulically operated actuator, providing a controller with control logic and memory, connecting the controller to the pressure control valve, electrically energizing the pressure control valve with a control signal from the controller and providing a controlled hydraulic fluid pressure through the valve outlet to the actuator, sensing the pressure of the hydraulic fluid pressure and at a set point level providing a signal indicative thereof to the memory of the controller and storing the same in memory, measuring an amount of current to the pressure control valve necessary for the fluid pressure to reach the set point level, comparing the measured current with a preset value of the current as a function of the pressure signal, and adjusting the control signal based upon the current comparison for automatically calibrating the hydraulic control system.

The self-calibrating system for controlling a hydraulically operated device in accordance with the present invention comprises a hydraulically operated actuator, a pump connected to said actuator for providing a source of pressurized hydraulic fluid, an electrically actuated pressure control valve disposed between the pump and the actuator, and fluidly connected therebetween, the control valve being operative to receive a hydraulic fluid at a supply pressure and provide the hydraulic fluid at a control pressure at the valve outlet, a controller having control logic and a memory in communication with the pressure control valve, the controller being operative for providing a control signal for actuating the pressure control valve, a pressure sensor for sensing the hydraulic fluid pressure disposed between the pressure control valve outlet and the hydraulically operated actuator, the pressure sensor being in communication with the controller and operative to provide a signal to the controller when the sensed pressure reaches a predetermined level, the controller being operative to store the signal in the memory and to measure an amount of current to the pressure control valve resulting from the control signal, and the controller being operative to compare the measured current with a calibrated value of current as a function of the pressure, wherein the controller is operative to adjust the control signal based upon the comparison.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is described and illustrated.

DETAILED DESCRIPTION OF THE INVENTION

Figure 1:
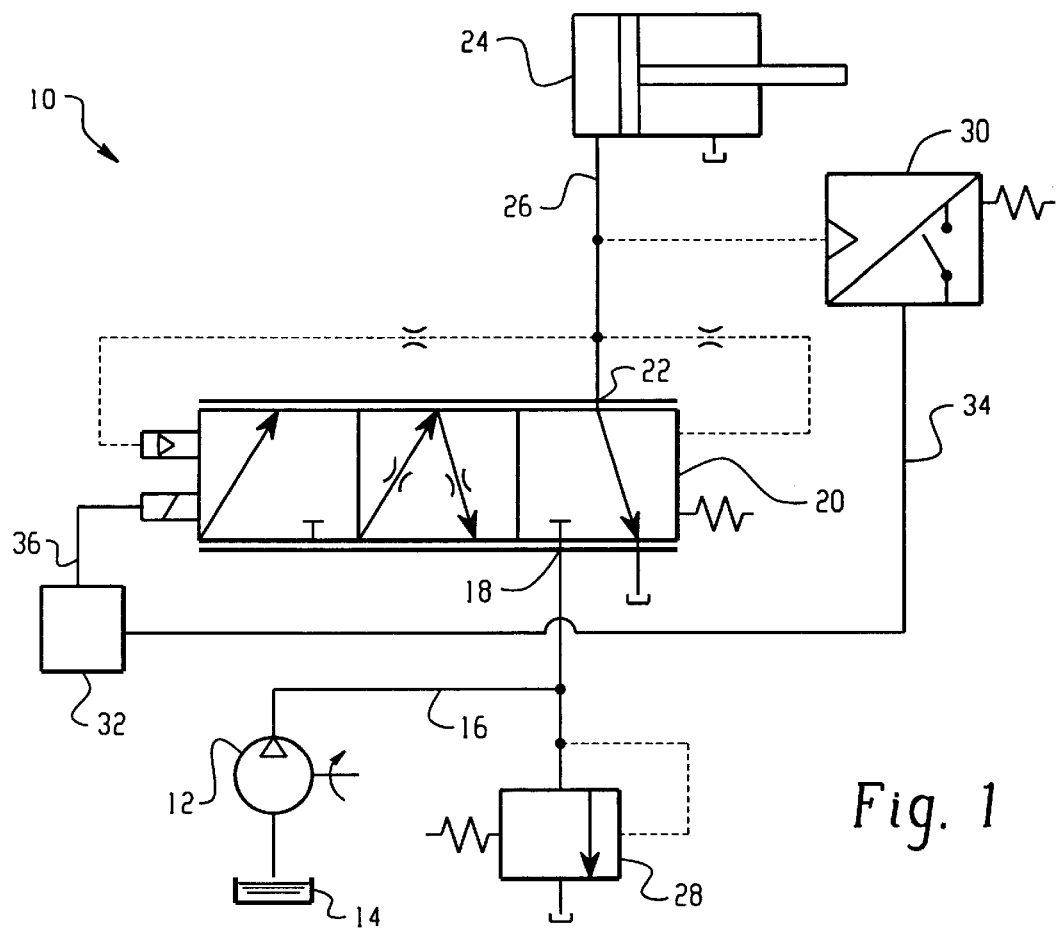
FIG. 1 is a schematic illustration of the hydraulic control system in accordance with the present invention.

Referring to the figures, which are not intended to limit the present invention, and where like numerals designate like or similar features throughout the several views, and first in particular to FIG. 1, there is shown a schematic of a self-calibrating system (generally designated 10) for controlling a hydraulically operated device in accordance with the present invention. A pump 12 which may be driven directly by a vehicle's engine receives hydraulic fluid from a reservoir 14 and supplies the hydraulic fluid under pressure through conduit 16 to the inlet 18 of an electrically operated pressure control valve 20 such as a variable force solenoid operated valve. An outlet 22 from control valve 20 is connected through conduit 26 to a hydraulically operated device for example, a hydraulically operated actuator 24. A pressure regulating valve 28 is preferably connected to conduit 16 to regulate the hydraulic fluid pressure from pump 12 and to supply a constant hydraulic fluid pressure to the inlet 18 of control valve 20. A pressure switch 30 is disposed in conduit 26 between control valve 20 and hydraulic actuator 24. Pressure switch 30 is connected to a controller 32 via line 34, and communicates with the controller 32 when the fluid pressure reaches a set point or predetermined level. Controller 32 communicates with control valve 20 through line 36 to instruct control valve 20 when a controlled fluid pressure from outlet 22 is required.

In the preferred embodiment of the present invention, system 10 is constructed for use in a vehicle automatic power transmission. Pump 12 is typically situated in the automatic transmission and driven by the engine operating at different engine speeds (RPMs). Reservoir 14 supplies automatic transmission fluid to pump 12. Pressure regulator 28 regulates the fluid pressure so that the fluid is supplied to the inlet 18 of hydraulic control valve 20 at a fairly constant pressure. Regulator 28 is typically situated within the transmission. Control valve 20 is an electrically operated pressure control valve such as a variable force solenoid valve which may be either an inversely proportional variable force solenoid valve or a directly proportional variable force solenoid valve. Suitable variable force solenoid valves for use in the instant invention are disclosed in U.S. Pat. Nos. 5,853,028; 5,513,832; and 4,947,893 which are all assigned to the Assignee of the present invention and hereby incorporated by reference. U.S. Pat. No. 5,513,673, also assigned to the Assignee of the present invention and hereby incorporated by reference, discloses an electrically modulated pressure regulator valve with variable force solenoid valve suitable for use in the present invention.

As mentioned earlier, a vehicle control system includes an electronic control module such as an engine control module (ECM), and usually includes an additional electronic control module for effecting control of a transmission control module (TCM). The engine (ECM) and transmission control modules may be combined in a single electronic control module, but more commonly are separate units. In the present invention, controller 32 is preferably a TCM and is typically located outside of the automatic transmission housing. However, the TCM 32 may be positioned in the transmission housing if desired.

Figure 2:
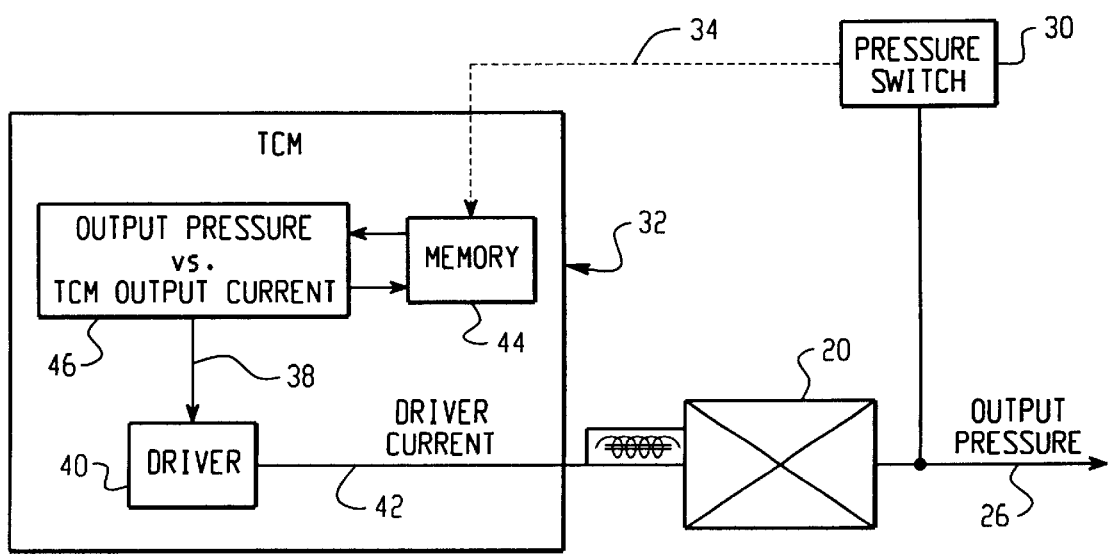
FIG. 2 is a block diagram of several of the primary components of the system of the present invention.

Referring next to FIG. 2, when the TCM 32 receives a shift command, or a pressure command either manually from the operator or automatically from the ECM (not shown), a control signal is sent by way of line 38 to a current driver 40 contained therein. Driver 40 sends a driver current signal by way of line 42 to the electrically operated pressure control valve 20. As mentioned previously, control valve 20 is preferably a three-way variable force solenoid valve. Control valve 20, in response to the driver current signal, produces a desired or controlled fluid pressure. In the current state-of-art electrically operated hydraulic control valves, the control valve 20 receives the current signal from the controller 32 and adjusts the hydraulic fluid pressure to an expected amount either proportionally or inversely proportionally to the current.

When the hydraulic fluid pressure in conduit 26 reaches a predetermined or set point level, pressure switch 30 senses the pressure, changes state, and relays this information to TCM 32. FIG. 2 illustrates the signal being transmitted by dashed line 34 to TCM 32. Pressure switch 30 is preferably constructed as described in U.S. Pat. No. 5,728,986. This patent is assigned to the Assignee of the present invention and hereby incorporated by reference. TCM 32 stores the signal from pressure switch 30 in memory 44. TCM 32 then measures or calculates the driver current necessary to cause pressure switch 30 to trip, and compares the measured current with the previously calibrated value of the current as a function of pressure. TCM 32 then adjusts its control signal based upon this comparison using the programmable logic of microprocessor 46. The adjusted control signal is then stored in memory 44.

Figure 3:
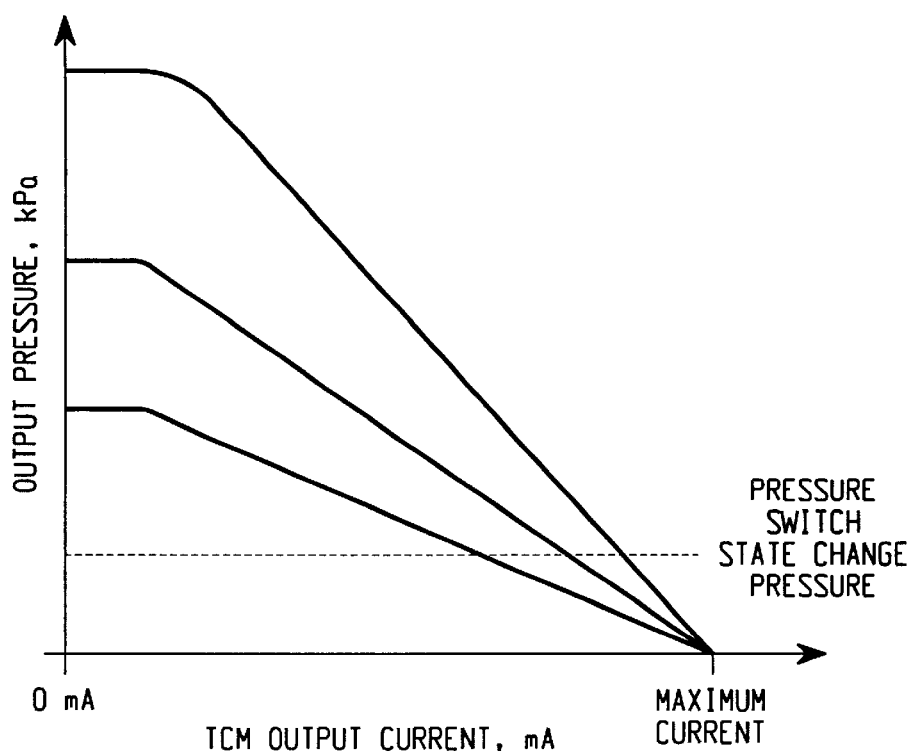
FIG. 3 is a graph of a typical family of pressure curves for an inversely proportional variable force solenoid valve in kiloPascals (kPa) versus the transmission control module output current in milliamperes (mA)
Figure 4:
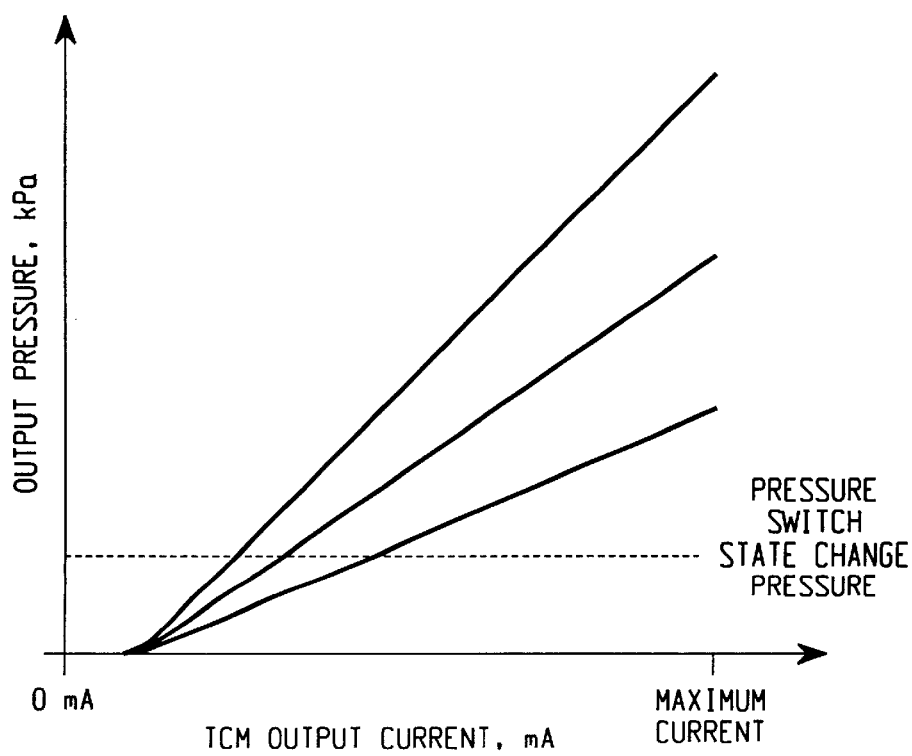
FIG. 4 is a graph of a typical family of pressure curves for a directly proportional variable force solenoid valve in kiloPascals (kPa) versus transmission control module output current in milliamperes (mA).
Figure 5:
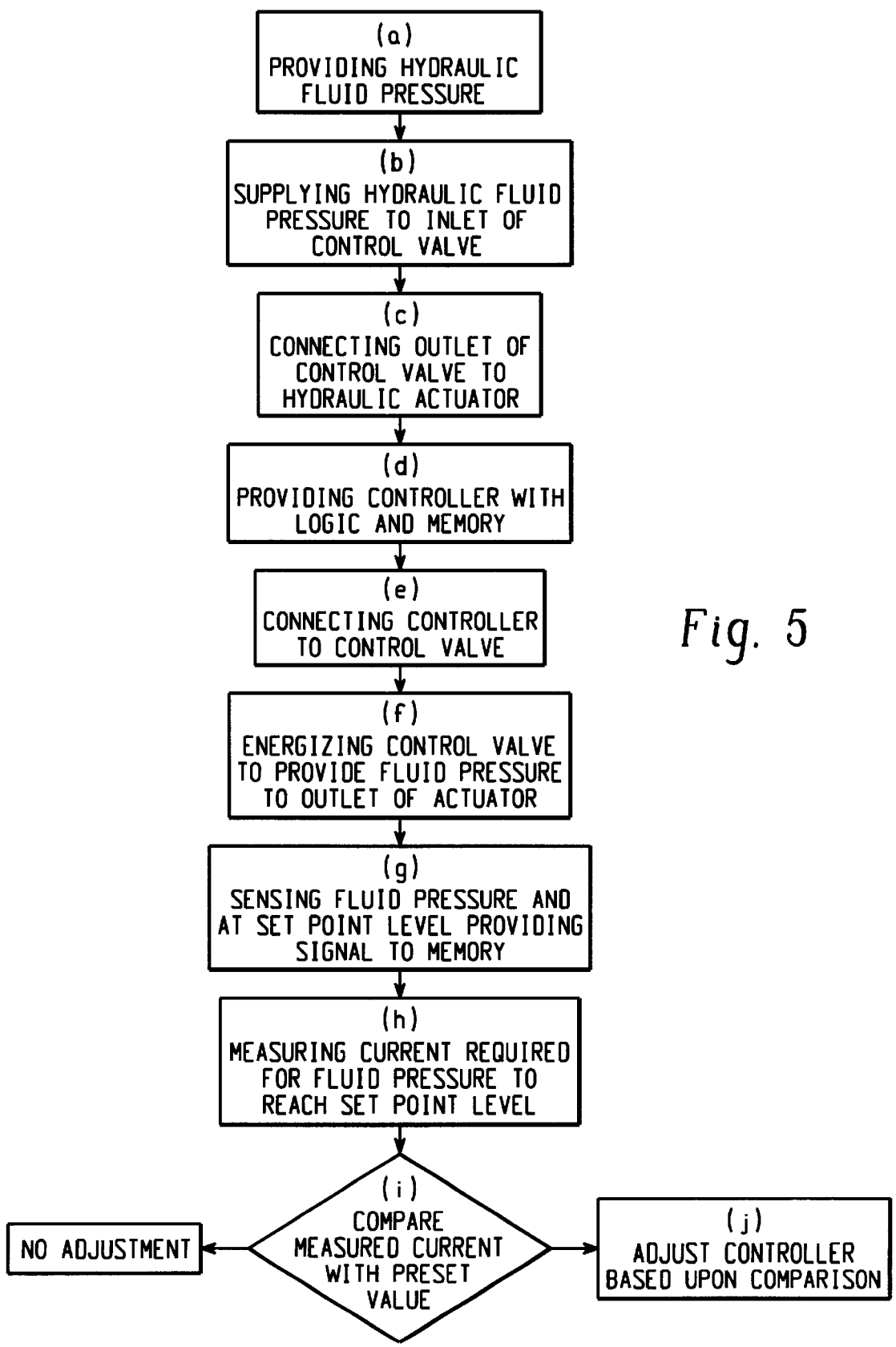
FIG. 5 is a flow chart depicting the various steps in accordance with the method of the present invention.

FIG. 3 is a graph of a number of pressure curves for several inversely proportional control valves. The output pressure is given in kiloPascals (kPa), versus the transmission control module output current in milliamperes (mA). The dashed line indicates where the pressure switch 30 changes state or will trip. As is clearly shown, the pressure switch set point is situated on a linear portion of the curve. FIG. 4 is a similar graph, but of several directly proportional hydraulic control valves. In a similar manner, the dashed line reveals the region where the pressure switch changes state. FIGS. 3 and 4 show that the system of the present invention will operate with a wide variety of either type of control valve.

When the pressure switch trips, the TCM 32 records the current delivered to the control valve 20 at that point. This current value is stored in memory and is used to adjust the previously calibrated current required for a pressure command. The calibration curve assumes a constant slope based on the family of curves shown in FIGS. 3 and 4.

The mathematical adjustment in the calibration is made with the following equation:

$$\text{Pressure Slope} = \frac{Pmax - Pswitch}{Imax - Iswitch}$$

Where:
- I max=maximum current
- I switch=current at which the pressure switch changes state
- P max=maximum pressure
- P switch=pressure at which the pressure switch changes state In addition to the self-calibrating hydraulic control system, the present invention is also directed to a method for automatically calibrating a hydraulic control system.

The present invention advantageously employs an accurate and precise pressure switch 30 that trips at a desired or set point pressure, for example, in an automatic transmission application, at 18 psi (pounds per square inch). In contrast to the other known vehicle on-board diagnostic applications that use a pressure switch, the present invention employs a pressure switch that is precise and provides feed-back to the transmission control module 32. This differs from prior on-board diagnostic applications. The transmission control module of the present invention records the current delivered at the trip or set point. Memory 44 stores the current at that point and compares that point to the pre-calibrated current associated with that pressure and temperature. The programmable logic of the TCM adjusts or calibrates the current required to obtain a specific pressure. The present invention senses the fluid pressure fairly accurately with the pressure switch disclosed in U.S. Pat. No. 5,728,986 and provides feed-back to the controller for updating the calibration curve.

The present invention self-calibrates the controller to function fairly accurately with the hydraulic control valve. This eliminates the necessity of "tuning" these components prior to assembly in the final product, like a transmission. Further, as the subcomponents wear over time, the controller continues to adjust and compensate for wear. An additional advantage is that the present invention allows for looser tolerances for the components since the self-calibrating feature of the instant invention will compensate for the tolerances.

While a specific embodiment of the invention has been shown and described in detail to illustrate the application of the principles of the invention, it will be understood that the invention may be embodied otherwise without departing from such principles.

We claim:

1. A method for automatically calibrating a hydraulic control system comprising the steps of:
   (a) providing a source of hydraulic fluid pressure;
   (b) supplying said hydraulic fluid pressure to an inlet of an electrically operated pressure control valve;
   (c) connecting an outlet of said pressure control valve to a hydraulically operated actuator;
   (d) providing a controller with a control logic and a memory;
   (e) connecting said controller to said pressure control valve;
   (f) energizing said pressure control valve with a control signal from said controller and providing a controlled hydraulic fluid pressure through said valve outlet to said hydraulically operated actuator; and
   (g) sensing the pressure of said controlled hydraulic fluid pressure and at a set point level providing a signal indicative thereof to said memory of said controller and storing the same in memory;
   (h) measuring an amount of current to said pressure control valve required for said hydraulic fluid pressure to reach said set point level;
   (i) comparing said measured current with a preset value of said current as a function of pressure; and,
   (j) adjusting said control signal based upon a comparison of the measured current with the preset value of current for automatically calibrating the hydraulic control system.

2. The method defined in claim 1, wherein said step of sensing the pressure includes disposing a pressure switch in a conduit between said outlet of said pressure control valve and said hydraulically operated actuator.

3. The method defined in claim 1, wherein said step of energizing said pressure control valve includes electromagnetically operating said pressure control valve.

4. The method defined in claim 1, wherein said step of connecting said hydraulic fluid source to an electrically operated pressure control valve includes connecting said source to the inlet of a pressure balanced spool valve.

5. The method defined in claim 1, wherein said step of connecting said hydraulic fluid source to the inlet of an electrically operated pressure control valve includes connecting said inlet to a pressure regulating valve.

6. The method defined in claim 1, wherein said step of connecting the outlet of said pressure control valve includes connecting the outlet to a hydraulic actuator in an automatic power transmission.

7. A self-calibrating system for controlling a hydraulically operated device, comprising:
   (a) a hydraulically operated actuator;
   (b) a pump connected to said actuator for providing a source of pressurized hydraulic fluid;
   (c) an electrically actuated pressure control valve disposed between said pump and said actuator and fluidly connected therebetween, said control valve being operative to receive a hydraulic fluid at a supply pressure and provide the hydraulic fluid at a control pressure at the control valve outlet;
   (d) a controller having a control logic and a memory in communication with said pressure control valve, said controller being operative for providing a control signal for actuating said pressure control valve for achieving a desired fluid pressure;
   (e) a pressure sensor for sensing the hydraulic fluid pressure, said pressure sensor being disposed between said pressure control valve outlet and said hydraulically operated actuator, said pressure sensor being in communication with said controller and being operative to provide a signal to said controller when the sensed pressure reaches a predetermined level;
   (f) said controller having means for storing said signal in said memory and for measuring an amount of current required by said pressure control valve to supply hydraulic fluid at the desired fluid pressure;
   (g) said controller further having means for comparing said measured current with a calibrated value of current as a function of pressure, wherein said controller is operative to adjust said control signal based upon a comparison of said measured current with said calibrated current.

8. The system defined in claim 7 wherein said pressure sensor comprises a pressure switch.

9. The system defined in claim 7 wherein said pressure control valve includes a pressure balanced spool.

10. The system defined in claim 7, wherein said actuator comprises a clutch actuator.

11. The system defined in claim 7, wherein the hydraulically operated device comprises an automatic power transmission.

12. The system defined in claim 11, wherein said controller comprises a transmission control module.

13. The system defined in claim 12, wherein said pressure control valve comprises a variable force solenoid valve.

14. The system defined in claim 13, wherein said variable force solenoid valve comprises a three-way valve.

15. The system defined in claim 14, further comprising a pressure regulating valve connected to said pump for regulating hydraulic fluid pressure therefrom.

* * * * *